US007075416B2

(12) United States Patent
Johnson et al.

(10) Patent No.: US 7,075,416 B2
(45) Date of Patent: Jul. 11, 2006

(54) AUTOMOTIVE UNIVERSAL LATCH CONTROL IMPLEMENTATION

(75) Inventors: Curtis B. Johnson, Freeport, IL (US); Peter Suknaich, Belvidere, IL (US); Ajaykumar Vaidhyanathan, Chennai (IN)

(73) Assignee: Honeywell International Inc., Morristown, NJ (US)

( * ) Notice: Subject to any disclaimer, the term of this patent is extended or adjusted under 35 U.S.C. 154(b) by 86 days.

(21) Appl. No.: 10/873,857

(22) Filed: Jun. 21, 2004

(65) Prior Publication Data

US 2005/0280517 A1 Dec. 22, 2005

(51) Int. Cl.
*B60R 25/10* (2006.01)

(52) U.S. Cl. .......................... 340/426.28; 340/426.29; 340/635

(58) Field of Classification Search .......... 340/426.28, 340/426.29, 428, 430, 635, 643, 644, 648, 340/649, 650; 318/112, 443; 324/117 R, 324/207.21

See application file for complete search history.

(56) References Cited

U.S. PATENT DOCUMENTS

| | | | | |
|---|---|---|---|---|
| 4,418,381 | A | 11/1983 | Molusis et al. | |
| 4,832,158 | A * | 5/1989 | Farrar et al. | 187/316 |
| 5,351,028 | A | 9/1994 | Krahn | 338/32 R |
| 5,572,098 | A | 11/1996 | Dreon et al. | |
| 5,764,101 | A * | 6/1998 | Archer | 330/253 |
| 5,765,884 | A | 6/1998 | Armbruster | 292/216 |
| 5,820,924 | A | 10/1998 | Witcraft et al. | 427/130 |
| 5,912,631 | A * | 6/1999 | Kusunoki | 340/5.64 |
| 5,975,596 | A | 11/1999 | Rogers, Jr. et al. | 292/216 |
| 6,007,118 | A | 12/1999 | Arabia, Jr. et al. | 292/216 |
| 6,441,512 | B1 | 8/2002 | Jakel et al. | 307/10.2 |
| 6,445,171 | B1 | 9/2002 | Sasndquist et al. | 324/117 R |
| 6,474,706 | B1 | 11/2002 | Kalsi | 292/216 |
| 6,511,107 | B1 | 1/2003 | Barczynski et al. | 292/216 |
| 6,520,548 | B1 | 2/2003 | Fisher et al. | 292/201 |
| 6,545,463 | B1 * | 4/2003 | Dettmann et al. | 324/207.21 |
| 6,566,856 | B1 | 5/2003 | Sandquist et al. | 324/117 R |
| 6,568,722 | B1 | 5/2003 | Raffelsiefer et al. | 292/216 |
| 6,575,507 | B1 | 6/2003 | Reddmann | 292/216 |
| 6,583,591 | B1 * | 6/2003 | Echols et al. | 318/112 |
| 6,601,883 | B1 | 8/2003 | Kalsi | 292/216 |
| 2001/0050552 | A1 | 12/2001 | Sandquist et al. | |

(Continued)

FOREIGN PATENT DOCUMENTS

| | | |
|---|---|---|
| DE | 19944964 A1 | 3/2001 |
| WO | WO 99/29987 | 6/1999 |

OTHER PUBLICATIONS

PCT—Notification of Transmittal of The International Search Report and The Written Opinion of the International Searching Authority or the Declaration, Date of Mailing Oct. 27, 2005.

*Primary Examiner*—Van T. Trieu
(74) *Attorney, Agent, or Firm*—Kermit D. Lopez; Luis M. Ortiz

(57) ABSTRACT

Latch control methods and systems include a latch that receives power from a motor associated with an H-bridge circuit. A sensor can be provided for monitoring the latch, wherein the sensor obtains latch feedback data from the latch. A microcontroller controls the latch based on the latch feedback data, by controlling an interaction of the H-bridge circuit and the motor with the latch. Additionally, a microprocessor processes instructions for controlling the interaction of the H-bridge circuit and the motor with the latch. Such instructions can be implemented as Proportional Integral Derivative (PID) control instructions.

20 Claims, 7 Drawing Sheets

U.S. PATENT DOCUMENTS

| | | | | |
|---|---|---|---|---|
| 2002/0125994 | A1 | 9/2002 | Sandau | 340/5.62 |
| 2002/0180274 | A1 | 12/2002 | Suman | 307/10.2 |
| 2003/0043021 | A1 | 3/2003 | Chung | 340/5.71 |
| 2003/0182863 | A1 | 10/2003 | Mejean et al. | 49/26 |

* cited by examiner

1100

```
#define REGISTER_POS 292
#define CLOSED_POS 412
#define CLOSE_TO_RDY_POS_LO -44
#define CLOSE_TO_RDY_POS_DESIRED -50
#define CLOSE_TO_RDY_POS_HI -54
#define CLOSE_TO_RDY_P_GAIN 1.0
#define CLOSE_TO_RDY_D_GAIN 2.5
#define OPEN_POS_PHASE_1 -5
#define OPEN_POS_PHASE_2 5
#define OPEN_POS_FINAL 5
#define OPEN_FINAL_P_GAIN 2.0
#define OPEN_FINAL_D_GAIN .8
#define LOCK_TO_RDY_POS_LO -43
#define LOCK_TO_RDY_POS_DESIRED -33
#define LOCK_TO_RDY_POS_HI -23
#define LOCK_TO_RDY_P_GAIN 1.5
#define LOCK_TO_RDY_D_GAIN 1.2
#define SL_TO_RDY_POS_LO -46
#define SL_TO_RDY_POS_DESIRED -33
#define SL_TO_RDY_POS_HI -24
#define SL_TO_RDY_P_GAIN 0.8
#define SL_TO_RDY_D_GAIN 2.0
#define RDY_TO_LOCK_POS_LO -97
#define RDY_TO_LOCK_POS_DESIRED -103
#define RDY_TO_LOCK_POS_HI -110
#define RDY_TO_LOCK_P_GAIN 1.5
#define RDY_TO_LOCK_D_GAIN 2.0
#define LOCK_TO_SL_POS_LO -147
#define LOCK_TO_SL_POS_DESIRED -149
#define LOCK_TO_SL_POS_HI -151
#define LOCK_TO_SL_P_GAIN 1.5
#define LOCK_TO_SL_D_GAIN 0.8
#define RDY_TO_SL_POS_LO -147
#define RDY_TO_SL_POS_DESIRED -149
#define RDY_TO_SL_POS_HI -151
#define RDY_TO_SL_P_GAIN 0.8
#define RDY_TO_SL_D_GAIN 1.0
#define LOWER_TRAVEL_LIMIT_POS -151
#define UPPER_TRAVEL_LIMIT_POS 481
#define PSUEDO  OPEN  POS 0
```

*Fig. 11*

AUTOMOTIVE UNIVERSAL LATCH CONTROL IMPLEMENTATION

TECHNICAL FIELD

Embodiments are generally related to door latch assemblies, including door latching mechanisms utilized in automobiles and other vehicles. Embodiments are also related to techniques for automatically and remotely controlling vehicle door latches.

BACKGROUND OF THE INVENTION

Latching mechanisms (i.e., "latches") are utilized in a variety of commercial and industrial applications, such as automobiles, airplanes, trucks, and the like. For example, an automotive closure, such as a door for an automobile passenger compartment, is typically hinged to swing between open and closed positions and conventionally includes a door latch that is housed between inner and outer panels of the door. The door latch functions in a well-known manner to latch the door when it is closed and to lock the door in the closed position or to unlock and unlatch the door so that the door can be opened manually.

The door latch can be operated remotely from inside the passenger compartment by two distinct operators—a sill button or electric switch that controls the locking function and a handle that controls the latching function. The door latch is also operated remotely from the exterior of the automobile by a handle or push button that controls the latching function. A second distinct exterior operator, such as a key lock cylinder, may also be provided to control the locking function, particularly in the case of a front vehicle door. Each operator is accessible outside the door structure and extends into the door structure where it is operatively connected to the door latch mechanism by a cable actuator assembly or linkage system located inside the door structure.

Vehicles, such as passenger cars, are therefore commonly equipped with individual door latch assemblies which secure respective passenger and driver side doors to the vehicle. Each door latch assembly is typically provided with manual release mechanisms or lever for unlatching the door latch from the inside and outside of the vehicle, e.g. respective inner and outer door handles. In addition, many vehicles also include an electrically controlled actuator for remotely locking and unlocking the door latches.

Automotive latches are increasingly performing complex functions with fewer motors. For example, it is desirable to perform a variety of latch functions with only one motor. In such cases, increased accurate motor control systems and methods are required in order properly electrically actuate the latch and obtain the desired operation.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for an improved latch control and diagnostic mechanism.

It is another aspect of the present invention to provide for improved latching systems and methods for use in automobiles and other vehicles.

The aforementioned aspects of the invention and other objectives and advantages can now be achieved as described herein. Latch control methods and systems are disclosed, which includes a latch that receives power from a motor associated with an H-bridge circuit. Additionally, a sensor is provided for monitoring the latch, wherein the sensor obtains latch feedback data from the latch. A microcontroller controls the latch based on the latch feedback data, by controlling an interaction of the H-bridge circuit and the motor with the latch. Additionally, a microprocessor processes instructions for controlling the interaction of the H-bridge circuit and the motor with the latch. Such instructions can be implemented as Proportional Integral Derivative (PID) control instructions (i.e., a PID control algorithm or PID control module).

The sensor itself can be implemented as a magnetoresistive (MR) speed and direction sensor for providing speed and direction data indicative of a speed and a direction of the latch. The latch generally can include or be associated with a ring magnet, which together with the speed and direction sensor provides the speed and direction of the latch. Thus, through the merging of a PID control algorithm or PID control module and a constant velocity algorithm, a positional control system can be implemented while repeatedly performing the required operations of the latch (e.g., opening or closing the latch). The ring magnet with and the MR speed and direction sensor provides the system feedback for positioning information, which can serve as the input to the PID/constant velocity algorithm.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 11 illustrates a block diagram illustrating an example of position information which can be collected in accordance with an alternative embodiment of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
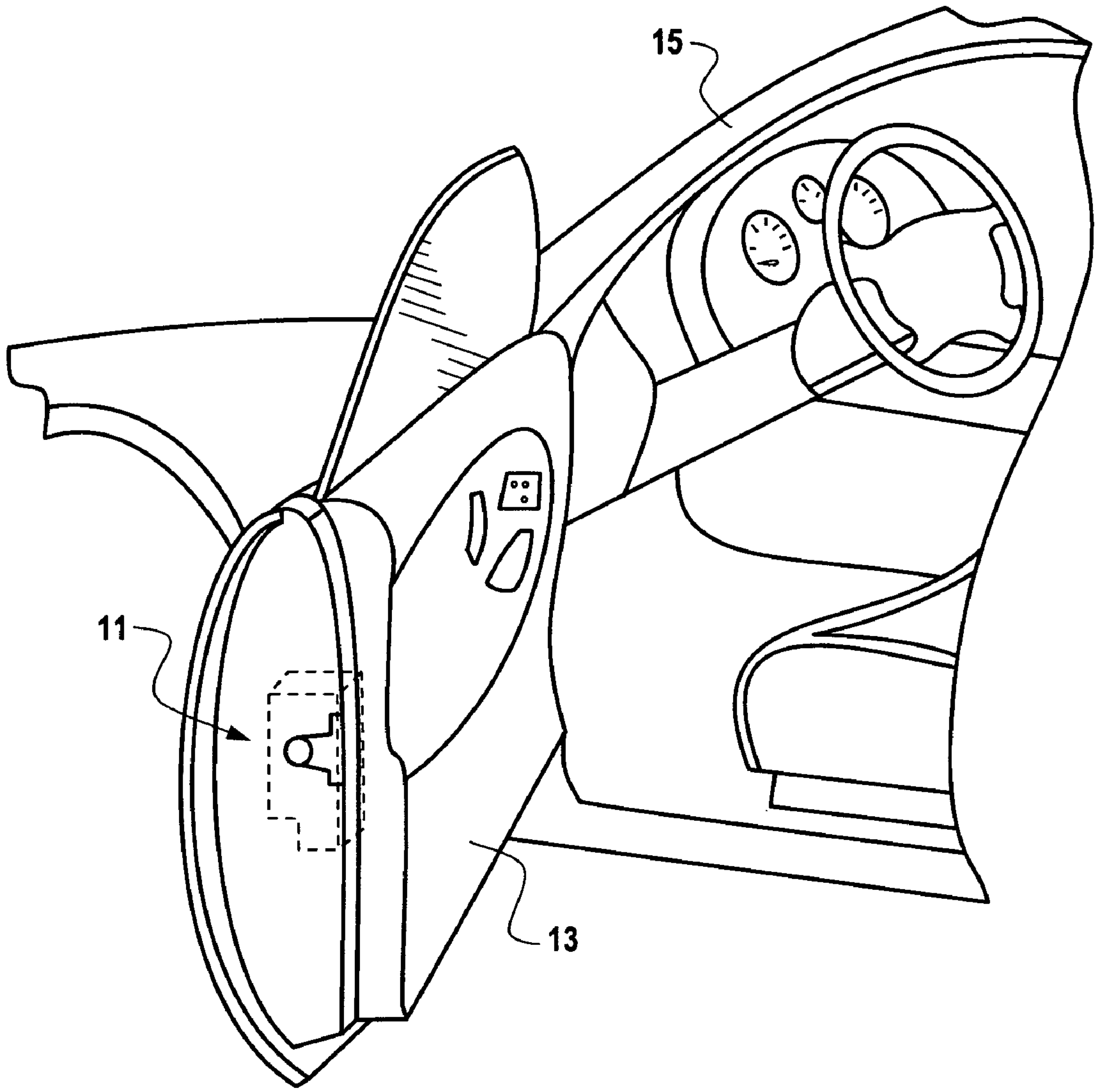
FIG. 1 illustrates a perspective view of a vehicle door mounted to a passenger vehicle in which a preferred embodiment of the present invention can be implemented.

FIG. 1 illustrates a perspective view of a vehicle door 13 mounted to a passenger vehicle in which a preferred embodiment of the present invention can be implemented. A vehicle, such as an automobile can be equipped with one or more individual door latch assemblies 11, which secure respective passenger and driver side doors to the vehicle 15. Each door latch assembly 11 is typically provided with manual release mechanisms or lever for unlatching the door latch from the inside and outside of the vehicle, e.g. respective inner and outer door handles. In addition, many vehicles can also be equipped with electrically controlled actuators for remotely locking and unlocking the door latches. As indicated in FIG. 1, a door latch assembly 11 can be mounted to a driver's side vehicle door 13 of a passenger vehicle 15. The door latch assembly 11 may be mounted to front and rear passenger side doors thereof and may be incorporated into a sliding side door, rear door, a rear hatch or a lift gate thereof, depending upon design constraints.

Figure 2:
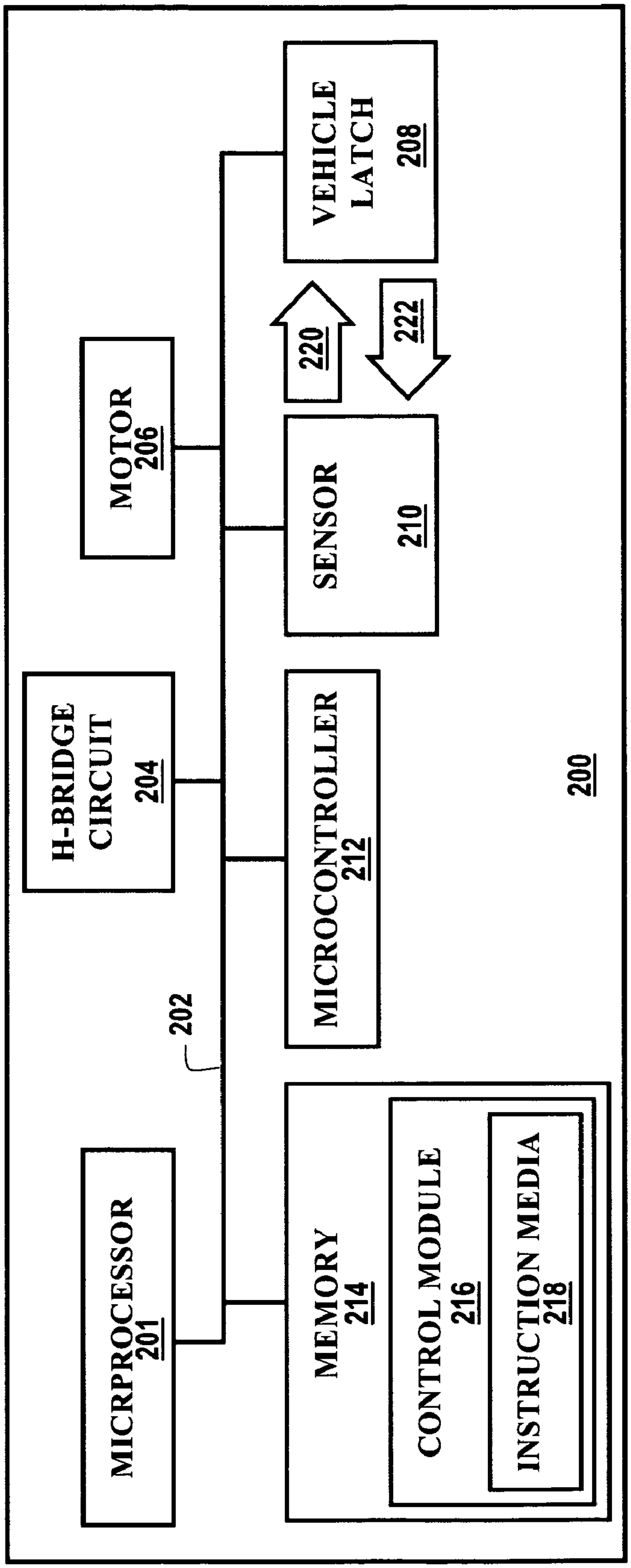
FIG. 2 illustrates a block diagram of a latch control system, which can be implemented in accordance with a preferred embodiment of the present invention.

FIG. 2 illustrates a block diagram of a latch control system 200, which can be implemented in accordance with a preferred embodiment of the present invention. System 200 can be implemented as a platform that allows for variable control of motor 206 and can react accordingly to sensor feedback stimulus, which is indicated by arrows 220 and 222. System 200 generally includes a microcontroller 212, which functions in association with microprocessor 201. System 200 also includes a vehicle latch 208 which provides feedback data detectable by sensor 210. Note that latch 208 of FIG. 2 is analogous to door latch assembly 11 of FIG. 1 and can be implemented within the context of an automobile, such as vehicle 15 of FIG. 1. Motor 206 can be implemented as a vehicle motor within an automobile, or can be implemented as a micro-motor or compact motor, which operates solely in association with and for the operation of latch 308.

Microprocessor 201 generally can be implemented as a central processing unit (CPU) via a single computer chip or a group of computer chips which function together to form a microprocessor unit. Microprocessor 201 therefore functions as the computational and control unit of system 200, and interprets and executes instructions provided to it via bus 202. Microprocessor 201 can fetch, decode, and execute instructions and transfer information to and from other resources of system 200 over bus 202. Microcontroller 212 can receive instructions and data over bus 202 and generally performs an arbitrating or regulating function for system 200. Microcontroller 212 can, for example, control access to memory 214 and act as a control unit for memory 214.

Memory 214 is connected bus 202, and includes a control module 216 that resides within memory 214 and contains instructions that when executed on microprocessor 201, can carry out logical operations and instructions. Control module 216 can, for example, contain instructions such as those depicted in the flow diagram 900 of FIG. 9 herein. Control module 216 can therefore implement a computer program product. It is important that, while the embodiments have been (and will continue to be) described in the context of a data-processing system such as system 200, embodiments are capable of being distributed as a program product in a variety of forms, and that such embodiments can apply, equally regardless of the particular type of signal-bearing media utilized to actually carry out the distribution.

Examples of signal-bearing media include: recordable-type media, such as floppy disks, hard disk drives and CD ROMs, and transmission-type media such as digital and analog communication links. Examples of transmission-type media include devices such as modems. A modem is a type of communications device that enables a computer to transmit information over a standard telephone line. Because a computer is digital (i.e., works with discrete electrical signals representative of binary 1 and binary 0) and a telephone line is analog (i.e., carries a signal that can have any of a large number of variations), modems can be utilized to convert digital to analog and vice-versa. The term "media" as utilized herein is a collective word for the physical material such as paper, disk, CD-ROM, tape and so forth, utilized for storing computer-based information.

Control module 216 can therefore be implemented as a "module" or a group of "modules". In the computer programming arts, a "module" can be typically implemented as a collection of routines and data structures that performs particular tasks or implements a particular abstract data type. Modules generally are composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based.

Thus, for example, the term module, as utilized herein generally refers to software modules or implementations thereof. Such modules can be utilized separately or together to form a program product that can be implemented through signal-bearing media, including transmission media and recordable media. A module can be composed of instruction media 218 which perform particular instructions or user commands, such as, for example controlling the interaction of H-bridge circuit 204, motor 206, latch 208, and microcontroller 212 and latch 208. Control module 216 can be implemented as a Proportional Integral Derivative (PID) control algorithm, which can be utilized for the control of loops. The PID control algorithm, in the context of the embodiments disclosed herein, also functions as a constant velocity algorithm. Thus, control module 216 provides for a combined PID algorithm and a constant velocity algorithm for obtaining position control of latch 208. In order for control loops thereof to function properly, the PID loop must be properly tuned. Standard methods for tuning loops and criteria for judging the loop tuning can be utilized for implementing control module 216, and is based on feedback between the sensor 210 and the vehicle 208 as indicated by arrows 220 and 220.

In order to implement control module 216 as a PID control algorithm or control module, it can be assumed that motor 206 moves to a particular position, and that sensor 210 and vehicle 208 together comprise a real-time feedback mechanism. Additionally, system 200 should be able control the power that is being fed into the system 206, which is derived from motor 206. Additionally, a "Proportional" aspect of system 200 should be present. For example, the output of microcontroller 212 should be proportional to any error or change in measurement derived from sensor 210 and latch 208. System 200 should also general possess an "integral" component. In other words, the output of microcontroller 212 should be proportional to the amount of time the error is present. For example, an integral action can eliminate offset. System can be modified to add an integral control to eliminate any steady-state error. Finally, system 200 should include a "derivative" component, in which the output of microcontroller 212 is proportional to the rate of change of the measurement or error, wherein the error is essentially the difference between where the system 300 currently is and where one desires it to be. The microcontroller 212 essentially runs the PID software (i.e., control program 216).

Motor 206 is generally subject to management by an H-bridge circuit 204. Note that specialized circuits (motor drivers) have been developed to supply motors with power and to isolate the other ICs from electrical problems. A useful circuit for driving DC motors (ordinary or gear head) is the so-called "H-bridge" circuit, which is generally shaped like the capital letter 'H' in many schematics. An important advantage of H-bridge circuit 204 is that the motor 206 can be driven forward or backward at any speed, optionally using a completely independent power source. H-bridge circuit 204 can be implemented utilizing various types of electrical and electronic components, such common bipolar transistors, FET transistors, MOSFET transistors, power MOSFETs, and computer chips.

Figure 3:
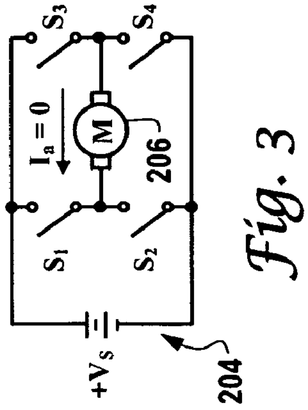
FIG. 3 illustrates a high-level circuit diagram of the H-bridge circuit depicted in FIG. 2, in which all switches thereof are in an open position, in accordance with one embodiment of the present invention.
Figure 4:
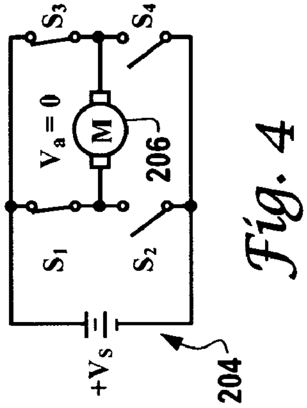
FIG. 4 illustrates a high-level circuit diagram of the H-bridge circuit depicted in FIG. 2, in which two switches thereof are in an open position, in accordance with one embodiment of the present invention.
Figure 5:
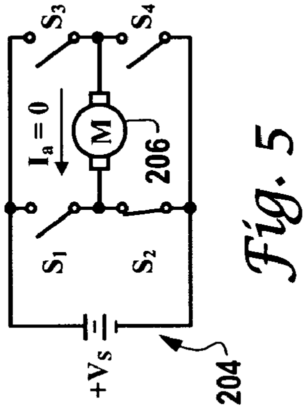
FIG. 5 illustrates a high-level circuit diagram of the H-bridge circuit depicted in FIG. 2, in which three switches thereof are in an open position, in accordance with one embodiment of the present invention.
Figure 6:
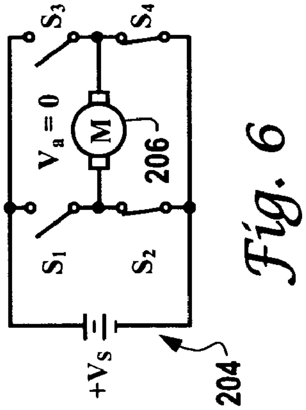
FIG. 6 illustrates a high-level circuit diagram of the H-bridge circuit depicted in FIG. 2, in which two switches thereof are in an open position, in accordance with one embodiment of the present invention.

FIG. 3 illustrates a high-level circuit diagram of the H-bridge circuit 204 depicted in FIG. 2, in which all switches thereof are in an open position, in accordance with one embodiment of the present invention. FIG. 4 illustrates a high-level circuit diagram of the H-bridge circuit 204 depicted in FIG. 2, in which two switches thereof are in an open position, in accordance with one embodiment of the present invention. FIG. 5 illustrates a high-level circuit diagram of the H-bridge circuit 204 depicted in FIG. 2, in which three switches thereof are in an open position, in accordance with one embodiment of the present invention. FIG. 6 illustrates a high-level circuit diagram of the H-bridge circuit 204 depicted in FIG. 2, in which two switches thereof are in an open position, in accordance with one embodiment of the present invention.

Figure 7:
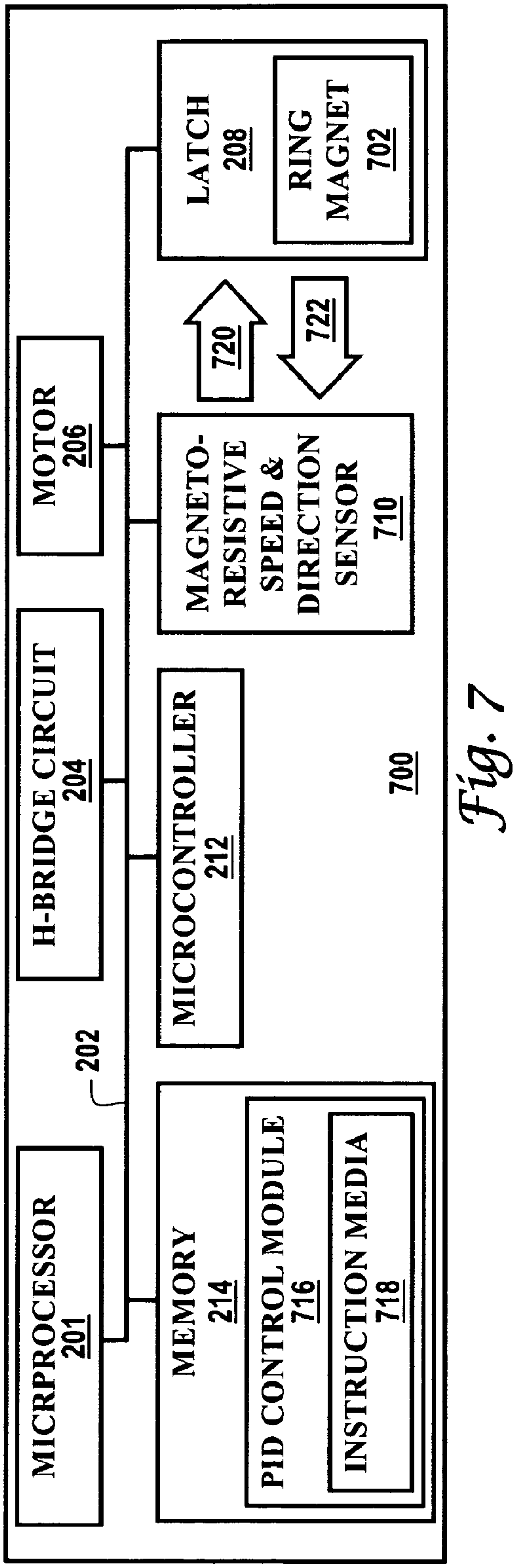
FIG. 7 illustrates a block diagram of a latch control system, which can be implemented in accordance with an alternative embodiment of the present invention.

Note that in FIGS. 2–6, identical or similar parts are generally indicated by identical reference numerals. H-bridge circuit 204 depicted in FIGS. 3–6 is presented for illustrative purposes only and is not to be considered a limiting feature of the present invention. Various other H-Bridge embodiments can be implemented, depending upon design considerations. H-bridge circuit 204 generally includes a plurality of switches $S_1$, $S_2$, $S_3$ and $S_4$. Switches $S_1$, $S_2$ are located in parallel with motor 206, which in turn is also located in parallel with switches $S_3$ and $S_4$. Switches $S_1$, $S_2$, and $S_3$, $S_4$ are positioned in parallel not only with motor 206, but also with voltage source $V_S$, thereby providing an "H-Bridge" configuration. The following provides a summary H-Bridge operations depicted in FIGS. 3–6:

1. Motor off=$S_1$, $S_2$, $S_3$, $S_4$ is open (as depicted in FIG. 3);
2. Motor rotating in direction A=$S_1$ & $S_4$ closed and $S_2$ & $S_3$ open;
3. Motor rotating in direction B=$S_1$ & $S_4$ open and $S_2$ & $S_3$ closed; and
4. Motor dynamically braked=$S_1$ & $S_3$ closed and $S_2$ & $S_4$ open;

FIG. 7 illustrates a block diagram of a latch control system 700, which can be implemented in accordance with an alternative embodiment of the present invention. Note that system 700 of FIG. 7 is similar to system 200 depicted in FIG. 2, except that instead of sensor 210, a magnetoresistive (MR) speed and direction sensor is utilized in association with latch 208, which includes a ring magnet 702. Sensor feedback is generally indicated by arrows 720 and 722. Note that in FIGS. 2 and 7, identical parts or components are generally indicated by identical reference numerals. System 700 also includes a PID control module 716 which includes instruction media 718 thereof. PID control module 716 is stored within memory 214.

MR speed and direction sensor 710 can be implemented utilizing varying types of MR sensors. An example of a magnetoresistive sensor, which can be adapted for use with an alternative embodiment of the present invention, is disclosed in U.S. Pat. No. 6,445,171, "Closed-Loop Magnetoresistive Current Sensor System Having Active Offset Nulling," which issued to Sandquist et al. on Sep. 3, 2003, and is assigned to Honeywell, Inc. headquartered in Morristown, N.J. Another example of a magnetoresistive sensor, which can be adapted for use with an alternative embodiment of the present invention is disclosed in U.S. Pat. No. 5,820,924, "Method of Fabricating a Magnetoresistive Sensor," which issued to Witcraft, et al. on Oct. 13, 1998 and is assigned to Honeywell, Inc. headquartered in Morristown, N.J.

A further example of a magnetoresistive sensor, which can be adapted for use with an alternative embodiment of the present invention, is disclosed in U.S. Pat. No. 5,351,028, "Magnetoresistive Proximity Sensor," which issued to Donald R. Krahn on Sep. 27, 1994, and is assigned to Honeywell, Inc. headquartered in Morristown, N.J. U.S. Pat. Nos. 6,445,171, 5,820,924, and 5,351,028 are incorporated herein by reference. The material disclosed in U.S. Pat. Nos. 6,445,171, 5,820,924, and 5,351,028 is referenced herein for exemplary and illustrative purposes only and should not be considered as limiting features of any embodiments disclosed herein.

Figure 8:
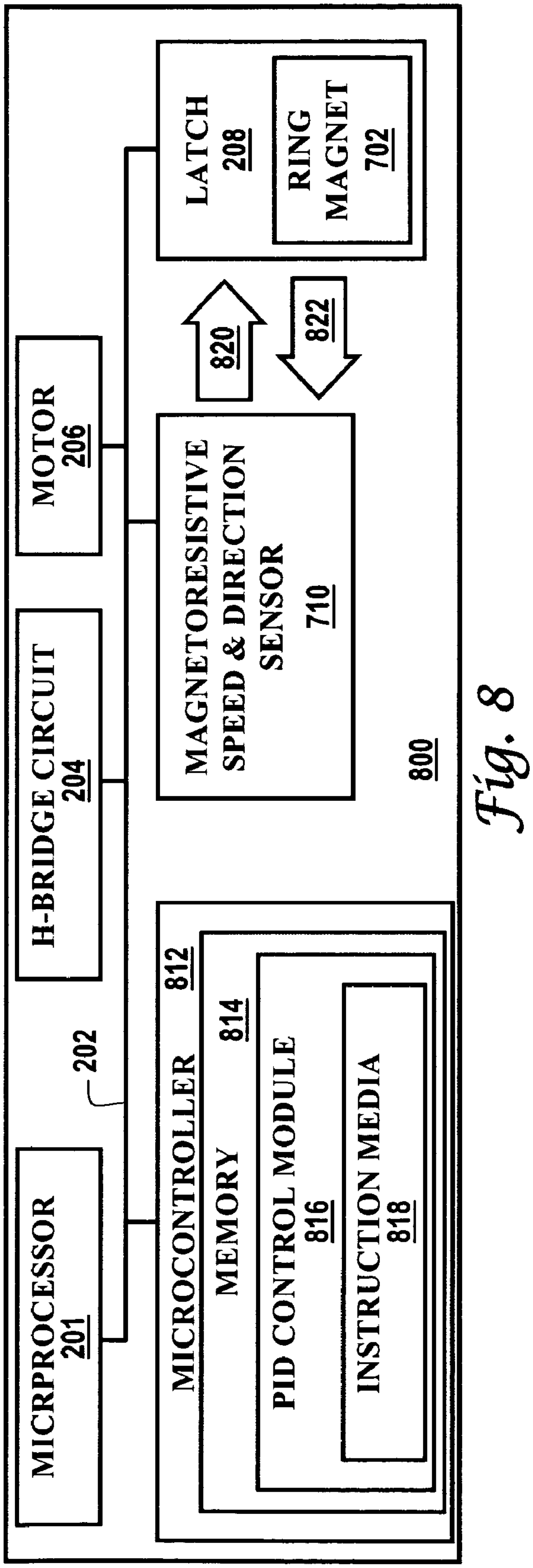
FIG. 8 illustrates a block diagram of a latch control system, which can be implemented in accordance with a further alternative embodiment of the present invention.

FIG. 8 illustrates a block diagram of a latch control system 800, which can be implemented in accordance with a further alternative embodiment of the present invention. In FIGS. 7 and 8, similar or identical parts are indicated by identical reference numerals. System 800 is similar to system 700, with the exception that the microcontroller 812 can be modified so that the memory 814, PID control module 816 and instruction media 818 thereof are embedded within the microcontroller 812. Sensor 710 thus sends and receives data (including feedback data) from latch 208, as indicated by arrows 820 and 822.

Figure 9:
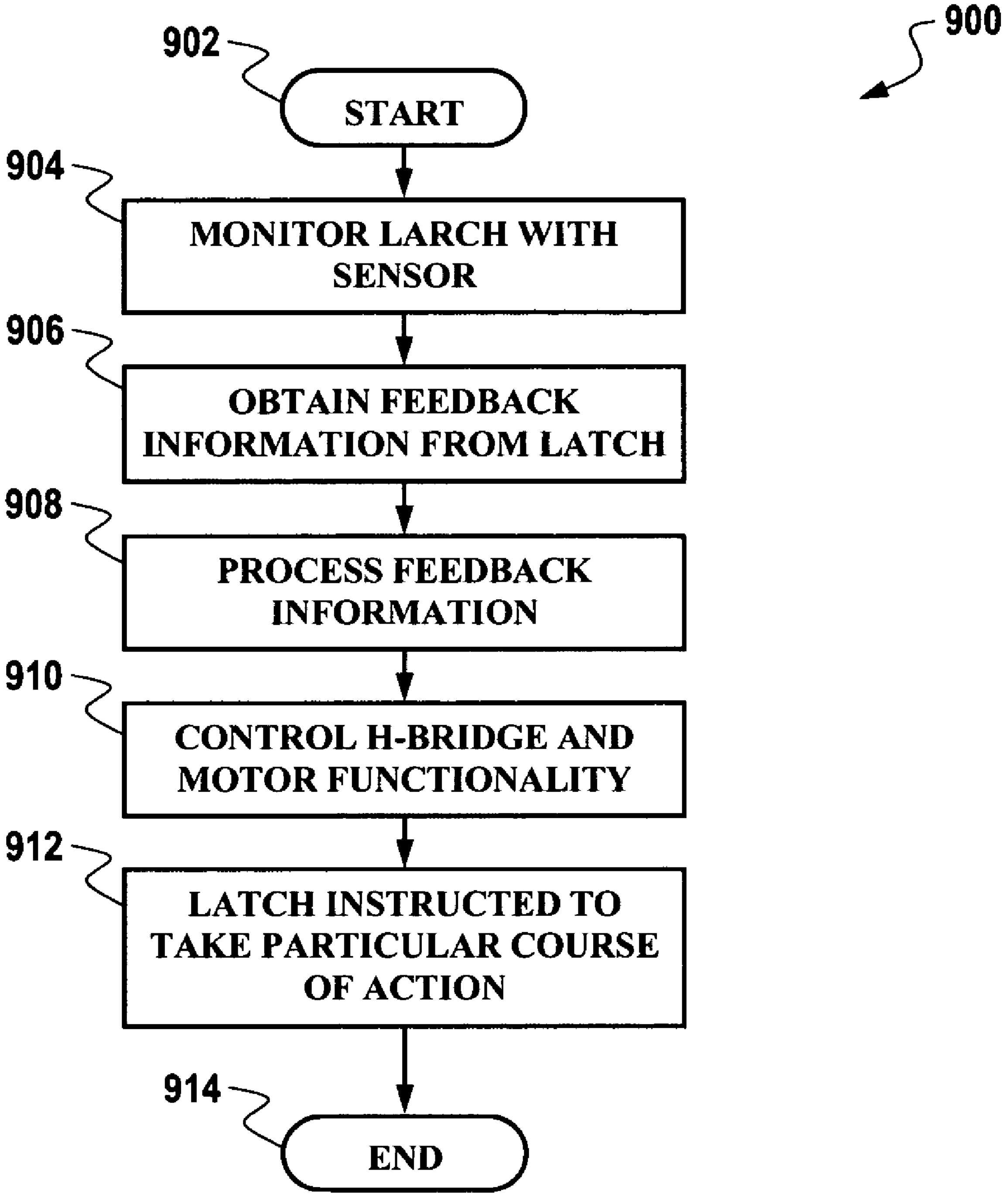
FIG. 9 illustrates a high-level flow chart of operations depicting logical operational steps which can be implemented in accordance with a preferred embodiment of the present invention.

FIG. 9 illustrates a high-level flow chart 900 of operations depicting logical operational steps which can be implemented in accordance with a preferred embodiment of the present invention. Flow chart 900 represents logical instructions which may be implemented as instruction media 218 of control program 216, stored within memory 214 of system 200 depicted in FIG. 2. Similarly, flow chart 900 can be implemented as instruction media 718 of PID control module 716 depicted in FIG. 7. The instructions depicted in FIG. 87 can be, for example, processed by microprocessor 201 of system 200 or system 700.

As indicated at block 902, the process is initiated. Thereafter, as indicated at block 904, the sensor (e.g., sensor 210, 710) can monitor a latch such as latch 208. A ring magnet, such as ring magnet 702 and the sensor (e.g., MR speed and direction sensor) can provide system feedback information related to the position of latch 208. Such information can be obtained from the latch via the sensor, as indicated at block 906, and thereafter, as depicted at block 908, such feedback data can be processed and provided as input to a PID/constant velocity algorithm (e.g., control module 216, 816). Next, as indicated at block 910, the H-Bridge and motor (e.g., see H-Bridge Circuit 204 and motor 206) can be controlled and instructed to provide a particular amount of power to the latch in order to initiate particular latch functions. The latch can then be instructed to take a particular course of action (e.g., close or open the latch), as described at block 914. Finally, the process ends, as indicated at block 914. Thus, through the merging of a PID algorithm and a constant velocity algorithm, position control of the latch can be achieved while repeatedly performing the required operations of the latch.

Based on the foregoing it can be appreciated that embodiments relate to a latch control methods and systems, including a program product. The latch generally receives power from a motor associated with an H-bridge circuit. Additionally, a sensor is provided for monitoring the latch, wherein the sensor obtains latch feedback data from the latch. A microcontroller controls the latch based on the latch feedback data, by controlling an interaction of the H-bridge circuit and the motor with the latch. Additionally, a microprocessor processes instructions for controlling the interaction of the H-bridge circuit and the motor with the latch. Such instructions can be implemented as PID control instructions. The sensor itself can be implemented as a magnetoresistive speed and direction sensor for providing speed and direction data indicative of a speed and a direction of the latch. The latch generally can include or be associated with a ring magnet, which together with the speed and direction sensor provides the speed and direction of the latch.

Figure 10:
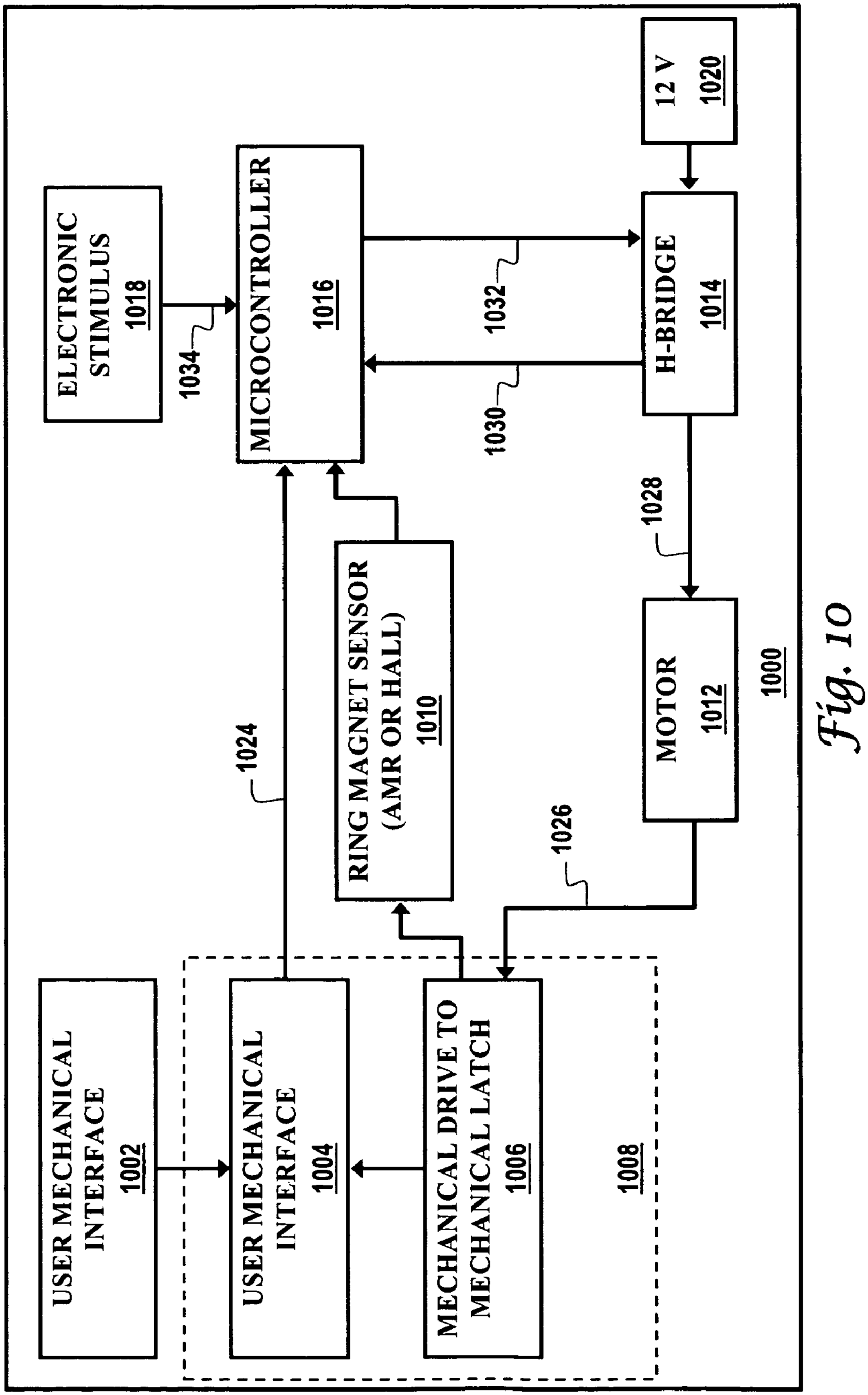
FIG. 10 illustrates a block diagram of a system, which can be implemented in accordance with an alternative embodiment of the present invention.

FIG. 10 illustrates a block diagram of a system 1000, which can be implemented in accordance with an alternative embodiment of the present invention. System 1000 includes a variety of components, such as a mechanical latch 1008, which is analogous and/or similar to the latch assembly 11 depicted in FIG. 1. Mechanical latch 1008 includes lever arm and claw functionality 1004 independently from a mechanical drive 1006 of mechanical latch 1008. Such a configuration permits the mechanical latch 1008 to function without any electrical input or interface. A user mechanical interface 1002 can be provided, however, as a set of gears that allow a single motor 1012 to drive the latch stimulated via electrical inputs, as indicated by line 1026.

System 1000 additionally includes an H-bridge circuit 1014 that receives logic levels from a microcontroller 1016 that determines the direction in which motor 1012 rotates. Such H-bridge inputs, as indicated by line 1030, can also be manipulated to provide dynamic braking to motor 1012 for greater latch position control via mechanical drive 1006. Microcontroller 1016 can provide PWM (Pulse Width Modulation) signals to H-bridge circuit 1014, as indicated by line 1030. PWM signals are essentially logical levels that provide the gating of the power to the motor 1012 as indicated by line 1028. The H-bridge circuit 1014 can also be connected a batter 1020 (e.g., 12 V) to thereby serve as a "gate" for the power to be delivered to motor 1012, again as indicated by line 1028. The PWM serves as the power "gate", wherein the larger the PWM percentage, the greater the power delivered to the motor and vice versa.

System 1000 also includes a ring magnet sensor 1010, which can be implemented as either a Hall sensor configuration or an AMR (Anisotropic Magnetoresistive) sensor configuration, depending upon design considerations. A ring magnet (not shown in system 1000) can be fixed to mechanical drive 1006. An AMR sensor, for example, can be adapted for use with system 1000 for sensor orientation and increased air gap performance. Sensor 1010 serves as a feedback mechanism to the microcontroller 1016, and may function as a primary input to the control algorithm. Thus, without such feedback, the system 1000 would fail.

Microcontroller 1016 is essentially the "brains" of the electrical drive of system 1000. Microcontroller 1016 can monitor mechanical inputs (e.g., door handles, sill know, claw, and the like) via sensor 1010. For example, stimulus from a lever arm and/or claw hall sensors can be typically initiated by a mechanical input, as represented by line 1023. Microcontroller 1016 can also be utilized to monitor any electrical stimulus, such as that generated by electrical stimulus functionality 1018 to determine if appropriate electrical action is required. Electronic stimulus can be provided via electrical input from, for example, a key fob, passive entry, door switch (lock/unlock), panic button, or any vehicle bus (CAN, LIN, etc.), command and so forth, as represented by line 1034.

If action is required, microcontroller 1016 can provide appropriate logical inputs to H-bridge circuit 1014, which can in turn deliver power to motor 1012, which in turn can drive the mechanical components of mechanical latch 1008 via mechanical drive 1006. Note that current feedback from H-bridge circuit 1014 to microcontroller 1016 is generally indicated by line 1032. During the entire motor drive operation, microcontroller 1016 monitors the progress via sensor 1010 (e.g., a ring magnet sensor). Such progress will vary the PWM based upon feedback obtained from sensor 1010. Feedback data can fed into a PID algorithm or functionality, such as, for example, PID control module 816 depicted in FIG. 8 to determine proper PWM. A PID control module such as PID control module 816 of FIG. 8 can contain several constants, depending upon the present latch position and location to which it is driven.

FIG. 11 illustrates a block diagram 1100 illustrating an example of position information which can be collected in accordance with an alternative embodiment of the present invention. In basic terms, a PID control module or algorithm is based on three factors—Proportional, Integral, Derivative (PID). The proportional term generally provides information based upon the present position, while the integral term can provide information based upon where a previous position of the system. The derivative provides information based upon where the system will be going. With a latch such as mechanical latch 1008 of FIG. 10, each function requires different motor driving needs. To adequate perform such functionalities, the PID terms can be customized for each function in order to provide optimal latch performance based upon power needs and positional system requirements. Block diagram 1100 therefore provides an example of the position information for each function and the PID constants. P_Gain, for example, is a proportional constant and D_Gain is a derivative constant. Note that for every operation there is a new P and D.

Figure 12:
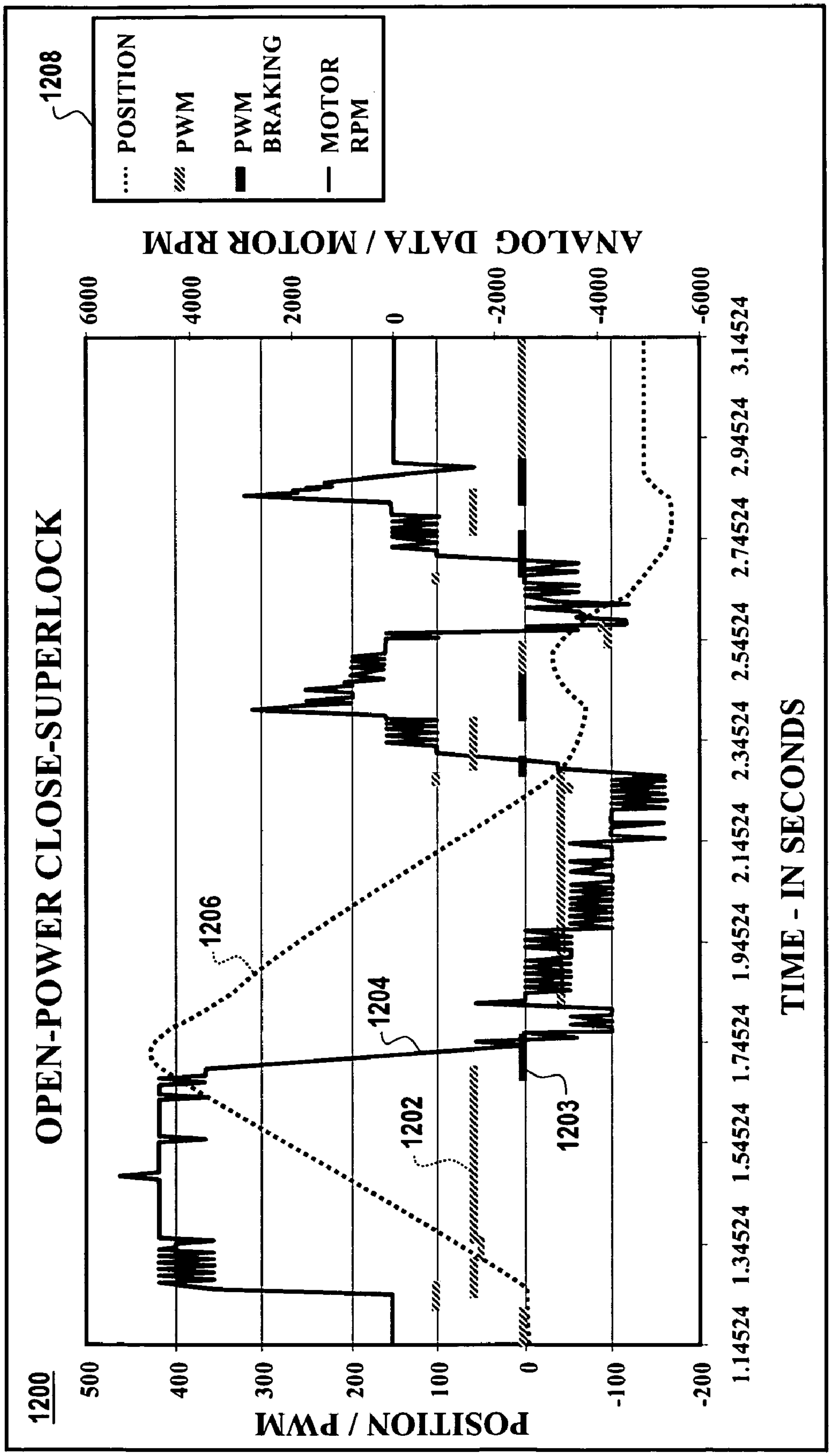
FIG. 12 illustrates a graph depicting the complexity of a motor drive algorithm in order to achieve a proper latch position, in accordance with an alternative embodiment of the present invention.

FIG. 12 illustrates a graph 1200 depicting the complexity of a motor drive algorithm in order to achieve a proper latch position, in accordance with an alternative embodiment of the present invention. Graph 1200 illustrates a routine in which a latch was power closed (i.e., door closed on its own from the half position to a fully closed position). Thereafter, the latch was immediately "super locked" as indicated by portion 1204 of graph 1200. The "power close" functionality is indicated by portion 12056 of graph 1200. Graph 1200 can be generated based on a plot of position/PWM versus time (i.e., in seconds). Portion 1202 of graph 1200 indicates PWM% of power to the motor, while portion 1203 indicates dynamic braking of the motor (e.g., motor 1012 of system 1000). A legend 1208 provides specific plot information.

PID can thus be utilizes as a basis for latch functionality, but in some instances other techniques may be utilized to best control the latch. A constant velocity algorithm, for example, can be utilized during the power close operation to limit noise and to appropriately drive the latch over the operating conditions. This algorithm can monitor the velocity of the system (via the ring magnet sensor feedback) and alter the power (PWM) to the motor accordingly based upon this feedback. In very rare situations, the latch can be driven merely by time, but such a circumstance should only be performed in association with closely monitoring the position feedback system. Controlling the latch by time alone has proven ineffective with such a complex control system. Thus, an overall control strategy can be based upon a complex control algorithm composed mainly of PID and constant velocity. It can be appreciated, however, that control systems other than PID-based systems may also be implemented in accordance with alternative embodiments. A combination of compensation networks can be utilized The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The invention claimed is:

1. A latch control method, comprising the steps of:

providing a latch, which receives power from a motor associated with an H-bridge circuit;

monitoring said latch with a magnetoresistive sensor that obtains latch feedback data from said latch; and controlling said latch based on said latch feedback data utilizing a microcontroller, which controls said latch, by controlling an interaction of said H-bridge circuit and said motor with said latch, wherein an output of said microcontroller is proportional to an error or a change in a measurement derived from said sensor and said latch.

2. The method of claim 1 further comprising the steps:

providing a microprocessor which processes instructions for controlling said interaction of said H-bridge circuit and said motor with said latch.

3. The method of claim 1 wherein said instructions comprise PID (Proportional Integral Derivative) control instructions.

4. The method of claim 3 wherein said PID control instructions comprise constant velocity instructions for obtaining a position control of said latch.

5. The method of claim 1 wherein said magnetoresistive sensor comprises a speed and direction sensor for providing speed and direction data indicative of a speed and a direction of said latch.

6. The method of claim 5 wherein said latch comprises a ring magnet, which together with said speed and direction sensor, provides said speed and direction of said latch.

7. A latch control system, comprising:

a latch, which receives power from a motor associated with an H-bridge circuit;

a magnetoresistive sensor for monitoring said latch, wherein said magnetoresistive sensor obtains latch feedback data from said latch; and a microcontroller, which controls said latch based on said latch feedback data, by controlling an interaction of said H-bridge circuit and said motor with said latch, wherein an output of said microcontroller is proportional to an error or a change in a measurement derived from said sensor and said latch.

8. The system of claim 7 further comprising a microprocessor which processes instructions for controlling said interaction of said H-bridge circuit and said motor with said latch.

9. The system of claim 7 wherein said instructions comprise PID (Proportional Integral Derivative) control instructions.

10. The system of claim 9 wherein said PID control instructions comprise constant velocity instructions for obtaining a position control of said latch.

11. The system of claim 7 wherein said magnetoresistive sensor comprises a speed and direction sensor for providing speed and direction data indicative of a speed and a direction of said latch.

12. The system or claim 11 wherein said latch comprises a ring magnet, which together with said speed and direction sensor provides said speed and direction of said latch.

13. A program product residing in a memory of a data-processing system for controlling a latch, comprising:

instruction media residing in a memory of a data-processing system for providing a latch with power from a motor associated with an H-bridge circuit;

instruction media residing in a memory of a data-processing system for monitoring said latch with a magnetoresistive sensor that obtains latch feedback data from said latch; and instruction media residing in a memory of a data-processing system for managing a microcontroller, which controls said latch based on said latch feedback data, by controlling an interaction of said H-bridge circuit and said motor with said latch wherein an output of said microcontroller is proportional to an error or a chance in a measurement derived from said sensor and said latch.

14. The program product of claim 13 further comprising instruction media residing in a memory of a data-processing system for instructing a microprocessor to process instructions for controlling said interaction of said H-bridge circuit and said motor with said latch.

15. The program product of claim 13 wherein said instructions comprise PID (Proportional Integral Derivative) control Instructions wherein said PID control instructions further comprise constant velocity instructions for obtaining a position control of said latch.

16. The program product of claim 13 wherein said sensor comprises a magnetoresistive speed and direction sensor for providing speed and direction data indicative of a speed and a direction of said latch.

17. The program product of claim 16 wherein said latch comprises a ring magnet, which together with said magnetoresistive speed and direction sensor, provides said speed and direction of said latch.

18. The program product of claim 13 wherein each of said instruction media further comprises signal bearing media.

19. The program product of claim 18 wherein said signal bearing media further comprises recordable media.

20. The program product of claim 18 wherein said signal bearing media further comprises transmission media.

* * * * *